US008526130B2

(12) United States Patent
Sugiyama

(10) Patent No.: US 8,526,130 B2
(45) Date of Patent: Sep. 3, 2013

(54) OSCILLATING ACTUATOR DRIVE UNIT, LENS BARREL, OPTICAL APPARATUS, METHOD FOR ADJUSTING A VOLTAGE, AND COMPUTER-READABLE RECORDING MEDIUM

(75) Inventor: Hideaki Sugiyama, Yokohama (JP)

(73) Assignee: Nikon Corporation, Tokyo (JP)

(*) Notice: Subject to any disclaimer, the term of this patent is extended or adjusted under 35 U.S.C. 154(b) by 261 days.

(21) Appl. No.: 12/874,645

(22) Filed: Sep. 2, 2010

(65) Prior Publication Data

US 2011/0164331 A1    Jul. 7, 2011

(30) Foreign Application Priority Data

Sep. 3, 2009   (JP) ................ P2009-203697

(51) Int. Cl.
*G02B 7/02* (2006.01)
(52) U.S. Cl.
USPC .......................................... 359/823; 359/694
(58) Field of Classification Search
USPC ................................................ 359/823
See application file for complete search history.

(56) References Cited

U.S. PATENT DOCUMENTS

| 5,777,444 A | 7/1998 | Motegi | |
|---|---|---|---|
| 2007/0108870 A1* | 5/2007 | Atsuta | 310/317 |

FOREIGN PATENT DOCUMENTS

| JP | A-9-163766 | 6/1997 |
|---|---|---|
| JP | A-09-182467 | 7/1997 |
| JP | A-11-356069 | 12/1999 |
| JP | A-2002-374686 | 12/2002 |
| JP | A-2003-153558 | 5/2003 |
| JP | A-2009-47791 | 3/2009 |

OTHER PUBLICATIONS

Jun. 19, 2012 Notice of Reasons for Rejection issued in Japanese Patent Application No. 2009-203697 (with translation).
Aug. 23, 2011 Office Action issued in Japanese Application No. 2009-203697 (with translation).

* cited by examiner

*Primary Examiner* — James Jones
(74) *Attorney, Agent, or Firm* — Oliff & Berridge, PLC

(57) ABSTRACT

An oscillating actuator drive unit includes an oscillator unit that generates an oscillating signal having a first frequency; an amplifier unit that amplifies the oscillating signal based on a first amplification factor and generates a first amplified oscillating signal as a driving signal for driving an oscillating actuator; a voltage detecting unit that detects a first voltage associated with the first amplified oscillating signal; and a signal control unit that receives the first voltage from the voltage detecting unit and computes a second amplification factor with reference to at least the first voltage, the signal control unit supplying the second amplification factor to the amplifier unit to allow the amplifier unit to amplify the oscillating signal based on the second amplification factor, the amplified oscillating signal having a second voltage, the second voltage being closer to a target voltage than the first voltage.

25 Claims, 8 Drawing Sheets

OSCILLATING ACTUATOR DRIVE UNIT, LENS BARREL, OPTICAL APPARATUS, METHOD FOR ADJUSTING A VOLTAGE, AND COMPUTER-READABLE RECORDING MEDIUM

BACKGROUND

1. Field of the Invention

The present invention generally relates to an oscillating actuator drive unit, a lens barrel, an optical apparatus, a method for adjusting a voltage, and a computer-readable recording medium.

Priority is claimed on Japanese Patent Application No. 2009-203697, filed Sep. 3, 2009, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In an autofocus driving mechanism equipped in a lens barrel of an optical apparatus of a camera or the like, an oscillating actuator such as an ultrasonic motor is used. The ultrasonic motor includes a stator having a piezoelectric element and a rotor for performing rotational motion. The rotor is rotated by applying alternating voltage (AC voltage) at a frequency more than a predetermined frequency to the piezoelectric element of the stator. In this case, an LC (an inductor-capacitor) resonant circuit is formed by the capacitance of the piezoelectric element and the inductance of a driving unit to which AC voltage is applied.

With recent progress on miniaturization of a camera or the like, the miniaturization of the ultrasonic motor equipped in the autofocus mechanism is also under progress. While the ultrasonic motor is miniaturized, the capacitance of the piezoelectric element of the ultrasonic motor fluctuates due to the fluctuation of manufacturing conditions (hereafter manufacturing fluctuation), and also the inductance of the driving unit fluctuates due to the manufacturing conditions. The manufacturing fluctuations of the capacitance of the piezoelectric element and the driving unit change a peak value of the AC voltage applied to the LC circuit, in other words, the peak voltage $V_{p-p}$ of the AC voltage applied to the piezoelectric element of the ultrasonic motor is varied. As a result, for an ultrasonic motor whose driving velocity is controlled by the frequency of the AC voltage, the driving velocity of the ultrasonic motor fluctuates.

For the matter mentioned above, Japanese Unexamined Patent Application, First Publication, No. 2009-047791 describes that the fluctuation of the driving velocity of the ultrasonic motor is corrected by adjusting the frequency of the AC voltage applied to the piezoelectric element, so that the accuracy of the driving controllability of the ultrasonic motor is improved.

However, the method described in the patent publication does not reduce the fluctuation of the peak voltage $V_{p-p}$ of the AC voltage applied to the LC resonant circuit consisting of the inductance of the piezoelectric element of the ultrasonic motor and the driving unit, in which the fluctuation of the peak voltage $V_{p-p}$ of the AC voltage is caused by the manufacturing fluctuation of the piezoelectric element of the ultrasonic motor and the driving unit. When the peak voltage $V_{p-p}$ of the AC voltage is increased, the power consumption of a circuit increases. For example, for a camera or the like which is driven with a battery, there is a problem that the operable time period becomes shorter.

In view of the above, it will be apparent to those skilled in the art from this disclosure that there exists a need for an improved apparatus and/or method. This invention addresses this need in the art as well as other needs, which will become apparent to those skilled in the art from this disclosure.

SUMMARY

Accordingly, it is an object of some aspects of the present invention to provide an oscillating actuator drive unit, a lens barrel including the oscillating actuator drive unit, and an optical apparatus includes the oscillating actuator drive unit which reduces power consumption caused by the manufacturing fluctuation of the oscillating actuator.

In accordance with an aspect of the present invention, an oscillating actuator drive unit includes an oscillator unit that generates an oscillating signal having a first frequency; an amplifier unit that amplifies the oscillating signal based on a first amplification factor and generates a first amplified oscillating signal as a driving signal for driving an oscillating actuator; a voltage detecting unit that detects a first voltage associated with the first amplified oscillating signal; and a signal control unit that receives the first voltage from the voltage detecting unit and computes a second amplification factor with reference to at least the first voltage, the signal control unit supplying the second amplification factor to the amplifier unit to allow the amplifier unit to amplify the oscillating signal based on the second amplification factor, the amplified oscillating signal having a second voltage, the second voltage being closer to a target voltage than the first voltage.

In accordance with another aspect of the present invention, a lens barrel includes a lens; a motor driving the lens; an oscillating actuator coupled to the motor; and an oscillating actuator drive unit eclectically coupled to the oscillating actuator, and the oscillating actuator drive unit including an oscillator unit that generates an oscillating signal having a first frequency; an amplifier unit that amplifies the oscillating signal based on a first amplification factor and generates a first amplified oscillating signal as a driving signal for driving an oscillating actuator; a voltage detecting unit that detects a first voltage associated with the first amplified oscillating signal; and a signal control unit that receives the first voltage from the voltage detecting unit and computes a second amplification factor with reference to at least the first voltage, the signal control unit supplying the second amplification factor to the amplifier unit to allow the amplifier unit to amplify the oscillating signal based on the second amplification factor, the amplified oscillating signal having a second voltage, the second voltage being closer to a target voltage than the first voltage.

In accordance with another aspect of the present invention, an optical apparatus includes an optical system; and an oscillating actuator drive unit coupled to the optical system, and said oscillating actuator drive unit including an oscillator unit that generates an oscillating signal having a first frequency; an amplifier unit that amplifies the oscillating signal based on a first amplification factor and generates a first amplified oscillating signal as a driving signal for driving an oscillating actuator; a voltage detecting unit that detects a first voltage associated with the first amplified oscillating signal; and a signal control unit that receives the first voltage from the voltage detecting unit and computes a second amplification factor with reference to at least the first voltage, the signal control unit supplying the second amplification factor to the amplifier unit to allow the amplifier unit to amplify the oscillating signal based on the second amplification factor, the amplified oscillating signal having a second voltage, the second voltage being closer to a target voltage than the first voltage.

In accordance with another aspect of the present invention, a method for adjusting a voltage of an oscillating signal includes generating an oscillating signal having a first frequency; amplifying the oscillating signal based on a first amplification factor to generate a first amplified oscillating signal as a driving signal for driving an oscillating actuator; detecting a first voltage associated with the first amplified oscillating signal; computing a second amplification factor with reference to at least the first voltage; and amplify the oscillating signal based on the second amplification factor, the amplified oscillating signal having a second voltage, the second voltage being closer to a target voltage than the first voltage.

In accordance with another aspect of the present invention, a computer-readable recording medium recording a program which causes an ultrasonic motor to drive, the program includes generating an oscillating signal having a first frequency; amplifying the oscillating signal based on a first amplification factor to generate a first amplified oscillating signal as a driving signal for driving an oscillating actuator; detecting a first voltage associated with the first amplified oscillating signal; computing a second amplification factor with reference to at least the first voltage; and amplify the oscillating signal based on the second amplification factor, the amplified oscillating signal having a second voltage, the second voltage being closer to a target voltage than the first voltage.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DESCRIPTION OF EMBODIMENTS

Some embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

In the following, an embodiment of the present invention will be described with reference to drawings for an oscillating actuator drive unit, a lens barrel, and a camera according to an embodiment of the present invention.

Figure 1:
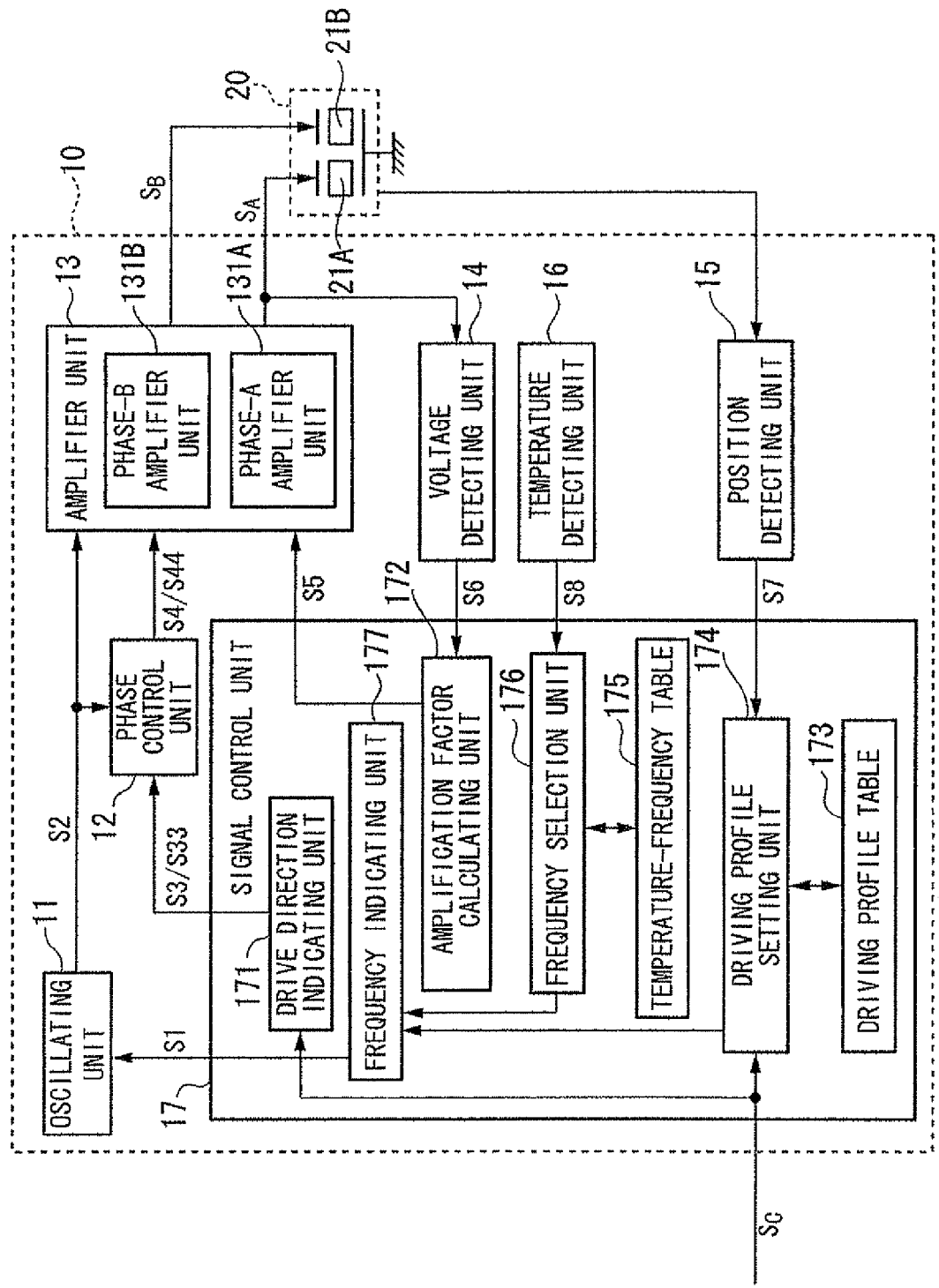
FIG. 1 is a schematic block diagram showing a configuration of an oscillating actuator drive unit in accordance with an embodiment of the present invention.

FIG. 1 is a schematic block diagram showing a configuration of an oscillating actuator drive unit 10 in an embodiment of the present invention. As shown in the figure, the oscillating actuator drive unit 10 applies driving signals $S_A$ and $S_B$ to an ultrasonic motor 20 in response to a drive command signal $S_C$ received from an upper stream control unit that is not shown here, in which the ultrasonic motor 20 is an oscillating actuator which is coupled to the oscillating actuator drive unit 10. The drive command signal Sc indicates a driving direction and a desirable drive quantity to be driven by the ultrasonic motor 20, in which the driving direction indicates either a forward direction or a reverse direction of the ultrasonic motor 20.

The ultrasonic motor 20 includes a toric oscillator (not shown) and a relative moving part (not shown; called a rotor or a moving part), in which the relative moving part rotates, so that a rotational drive output is obtained. The toric oscillator includes an elastic body having a pseudo toric shape and piezoelectric elements 21A and 21B coupled to the toric elastic body.

The piezoelectric elements 21A and 21B are electro-mechanical energy converting elements which convert electrical energy into mechanical energy. For example, a piezoelectric device, an electrostriction device or the like can be used. The piezoelectric elements 21A and 21B are members having tonic shapes, and divided into two parts to which two driving signals $S_A$ and $S_B$ having phase-A and phase-B are applied along the circumferential directions of the elastic body. The driving signal $S_A$ with the phase-A is applied to the piezoelectric element 21A, and the driving signal $S_B$ with the phase-B is applied to the piezoelectric element 21B. Further, the piezoelectric elements 21A and 21B are provided with polarizing elements in which the polarizing elements of the piezoelectric elements 21A and 21B are alternately arranged with spacing, and are bonded with the elastic body.

The oscillating actuator drive unit 10 includes an oscillating unit 11, a phase control unit 12, an amplifier unit 13, a voltage detecting unit 14, a position detecting unit 15, a temperature detecting unit 16, and a signal control unit 17.

The oscillating unit 11 receives a control signal S1 indicating an oscillating frequency from the signal control unit 17, and transmits an oscillating signal S2 having the indicated oscillating frequency with a predetermined duty ratio to the phase control unit 12 and the amplifier unit 13. The phase control unit 12 receives a forward drive direction signal S3 or a reverse drive direction signal S33 from the signal control unit 17. The forward drive direction signal S3 is used to drive the ultrasonic motor 20 in the forward direction. The reverse drive direction signal S33 is used to drive the ultrasonic motor 20 in the reverse direction. The phase control unit 12 changes a phase of the oscillating signal S2 of the oscillating unit 11 into either +90 degree or −90 degree while maintaining its frequency and generates a first phase signal S4 having a first phase or a second phase signal S44 having a second phase in response to the forward drive direction signal S3 or the reverse drive direction signal S33. For example, when the phase control unit 12 drives the ultrasonic motor 20 in the forward direction, the phase control unit 12 transmits the first phase signal S4 to the amplifier unit 13. When the phase control unit 12 drives the ultrasonic motor 20 in the reverse direction, the phase control unit 12 transmits the second phase signal S44 to the amplifier unit 13. Thereby, the driving direction of the ultrasonic motor 20 can be switched.

The signal control unit 17 transmits an amplification factor signal S5 to the amplifier unit 13. The amplifier unit 13 transmits a driving signal $S_A$ and a phase signal $S_B$ to the ultrasonic motor 20. The voltage detecting unit 14 detects a voltage associated with the driving signal $S_A$ transmitted by the amplifier unit 13. A typical example of the voltage may be, but is not limited to, the voltage of the driving signal $S_A$. The voltage detecting unit 14 transmits a converted voltage 56 to the signal control unit 17. The position detecting unit 15 transmits a position signal S7 to the signal control unit 17. The temperature detecting unit 16 transmits a temperature signal S8 to the signal control unit 17.

Figure 2:
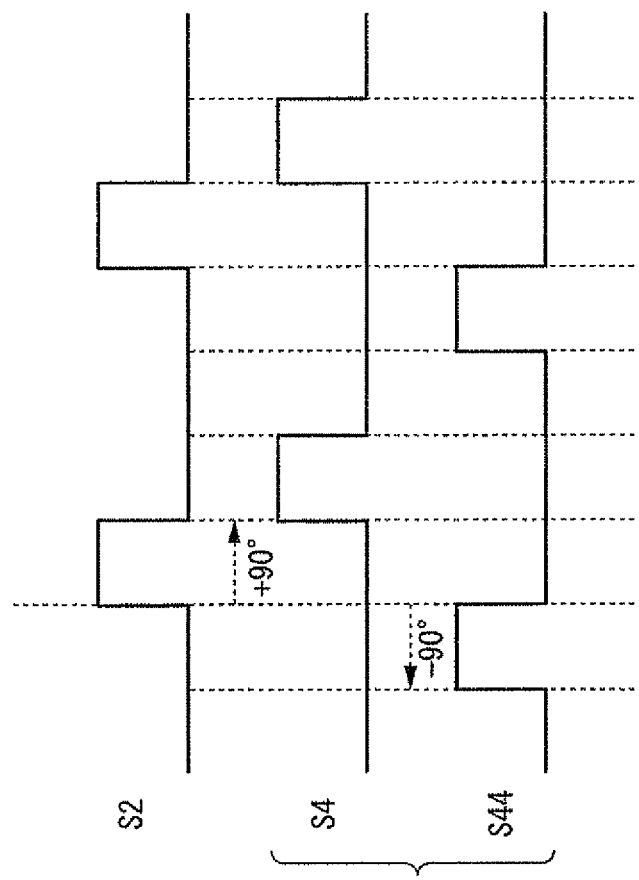
FIG. 2 is a schematic diagram showing an example of signals transmitted by a phase control unit in accordance with the embodiment of the present invention.

FIG. 2 is a schematic diagram showing an example of signals received from the phase control unit 12. In this case, the duty ratio of oscillating signals is set to be 25%. In FIG. 2, the lateral axis direction indicates time t and the vertical axis direction indicates a signal level of the oscillating signal. For example, when the phase control unit 12 receives the oscillating signal S2 from the oscillating unit 11 and receives a forward drive direction signal S3 from the signal control unit 17 for driving the ultrasonic motor 20 in the forward direction, the phase control unit 12 transmits the first phase signal S4 having the phase difference of +90 degree to the amplifier unit 13. On the other hand, when the phase control unit 12 receives the oscillating signal S2 from the oscillating unit 11 and receives a reverse drive direction signal S33 from the signal control unit 17 for driving the ultrasonic motor 20 in the reverse direction, the phase control unit 12 transmits the second phase signal S44 having the phase difference of −90 degree to the amplifier unit 13.

In FIG. 1, the amplifier unit 13 includes a phase-A amplifier unit 131A and a phase-B amplifier unit 131B. When the phase-A amplifier unit 131A receives the amplification factor signal S5 from the signal control unit 17, the phase-A amplifier unit 131A amplifies the oscillating signal S2 based on an amplification factor indicated by the amplification factor signal S5 and generates an amplified oscillating signal $S_A$. Then, the phase-A amplifier unit 131A applies the amplified oscillating signal $S_A$ to the piezoelectric element 21A of the ultrasonic motor 20 as a driving signal of the phase-A. When the phase-B amplifier unit 131B receives the amplification factor signal S5 from the signal control unit 17 and the first phase signal S4 or the second phase signal S44 from the phase control unit 12, the phase-B amplifier unit 131B amplifies the first or second phase signal S4 or S44 based on the amplification factor indicated by the amplification factor signal S5, and generates the phase signal $S_B$. Then, the phase-B amplifier unit 131B applies the phase signal $S_B$ to the piezoelectric element 21B of the ultrasonic motor 20 as a driving signal of the phase-B.

Figure 3:
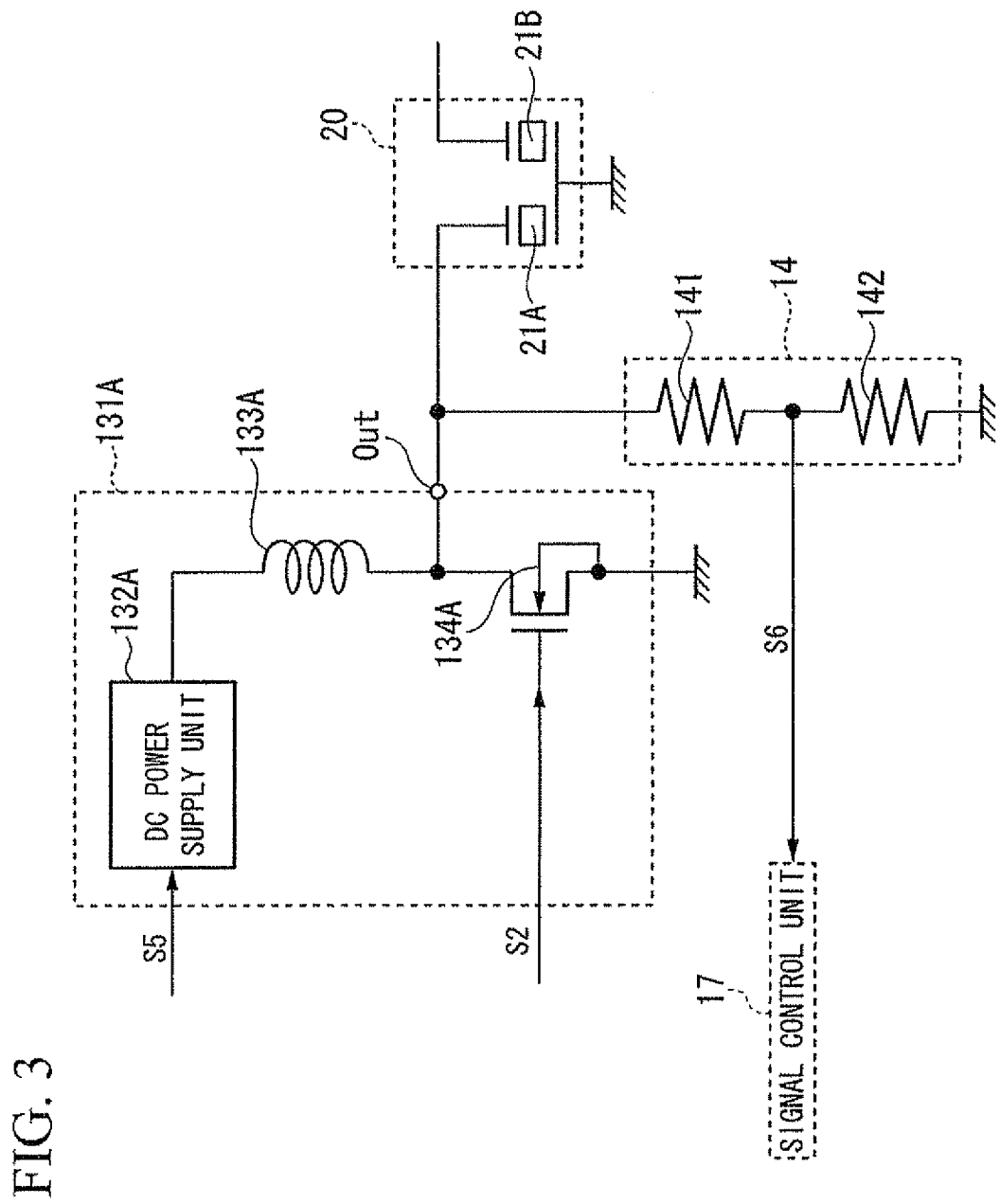
FIG. 3 is a schematic diagram showing an example of configurations of a phase-A amplifier unit and a voltage detecting unit in accordance with the embodiment of the present invention.

FIG. 3 is a schematic diagram showing an example of configurations of the phase-A amplifier unit 131A and a voltage detecting unit 14 in the present embodiment. As shown in the figure, the phase-A amplifier unit 131A includes a direct current power supply unit 132A (hereafter, a DC power supply unit 132A) and a coil unit 133A, and an N-channel field effect transistor (hereafter, an FET 134A). For example, the DC power supply unit 132A can be a DC/DC convertor or the like. The DC power supply unit 132A receives the amplification factor signal S5 indicating the amplification factor from the signal control unit 17, and changes an output voltage in response to the amplification factor signal. The coil unit 133A is connected to the DC power supply unit 132A at one end, and the other end of the coil unit 133A is connected to the drain of the FET 134A. The source of the FET 134A is connected to the ground, and the gate of the FET 134A receives the oscillating signal S2 from the oscillating unit 11. Further, a coupling point of the coil unit 133A and the drain of the FET 134A corresponds to an output end of the phase-A amplifier unit 131A.

The phase-A amplifier unit 131A is configured as described above. The FET 134A can be switched by ON/OFF states in response to the oscillating signal S2 received from the oscillating unit 11. As the drain of the FET 134A is coupled to the DC power supply unit 132A, the output of the FET 134A is converted to an output signal having the voltage supplied by the DC power supply unit 132A. As a result, the phase-A amplifier unit 131A can transmit the output signal at the same frequency and the same duty ratio as those of the oscillating signal S2 received from the oscillating unit 11 through an output terminal OUT coupled to the coupling point of the coil unit 133A and the drain of the FET 134A. In short, the phase-A amplifier unit 131A amplifies the oscillating signal S2 to the amplified oscillating signal $S_A$ having the voltage supplied of the DC power supply unit 132A, and applies the amplified oscillating signal $S_A$ to the piezoelectric element 21A of the ultrasonic motor 20 as the driving signal of the phase-A.

The phase-B amplifier unit 131B includes the same configuration as those of the phase-A amplifier unit 131A except two parts: the gate of an FET 134B in the phase-B amplifier unit 131B receives the first phase signal 54 or the second phase signal S44 from the phase control unit 12, and an output voltage of an amplified oscillating signal $S_B$ received from the phase-B amplifier unit 131B is applied to the piezoelectric element 21B of the ultrasonic motor 20. Further descriptions about the phase-B amplifier unit 131B are omitted.

As shown in FIG. 3, the voltage detecting unit 14 is a divider circuit composed of two resistance elements 141 and 142. The resistance element 141 is connected to the output terminal of the phase-A amplifier unit 131A at one end, and the other end of the resistance element 141 is connected to one end of the resistance element 142. The other end of the resistance element 142 is connected to ground. The coupling point of the resistance elements 141 and 142 corresponds to an output terminal of the voltage detecting unit 14. The voltage detecting unit 14 converts the voltage applied to the piezoelectric element 21A of the ultrasonic motor 20 into a converted voltage according to a resistance ratio between the resistance elements 141 and 142, and transmits the converted voltage S6 to the signal control unit 17.

In FIG. 1, the position detecting unit 15 can be a magnetic encoder, an optical encoder or the like. The position detecting unit 15 detects a rotation angle of the rotor of the ultrasonic motor 20, and transmits the position signal S7 indicating a driven quantity to the signal control unit 17, where the driven quantity is determined how much the ultrasonic motor 20 has been driven since the signal control unit 17 received the drive command signal Sc from the upper stream control unit. The temperature detecting unit 16 is arranged near the ultrasonic motor 20 and measures an ambient temperature of the ultrasonic motor 20. The temperature detecting unit 16 transmits the temperature signal S8 indicating the measured temperature to the signal control unit 17.

The signal control unit 17 includes a drive direction indicating unit 171, an amplification factor calculating unit 172, a driving profile table 173, a driving profile setting unit 174, a temperature-frequency table 175, a frequency selection unit 176, and a frequency indicating unit 177.

The drive direction indicating unit 171 receives the drive command signal Sc from the upper stream control unit which is not shown in the figure, and transmits the drive direction signal S3 or S33 indicating the driving direction of the ultrasonic motor 20 to the phase control unit 12 in response to the drive command signal Sc.

The amplification factor calculating unit 172 computes, in response to the converted voltage S6 received from the voltage detecting unit 14, the amplification factor which can set the voltage being applied to the piezoelectric element 21A of the ultrasonic motor 20 to a target voltage based on the converted voltage S6, and transmits the amplification factor signal S5 indicating the computed amplification factor to the amplifier unit 13. A typical example of the target voltage may be, but is not limited to, a rated voltage of the ultrasonic motor 20, which is preliminary determined when designed.

Figure 4A:
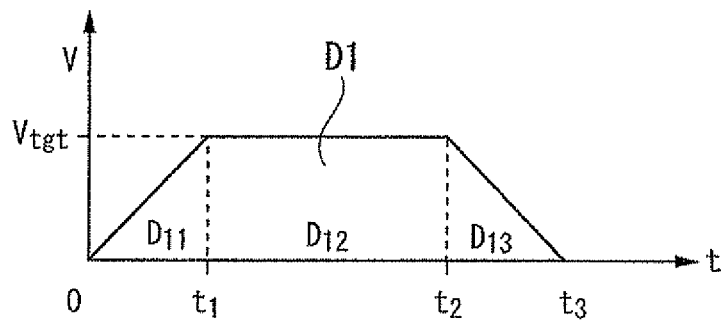
FIGS. 4A and 4B are examples of driving profiles in accordance with the embodiment.
Figure 4B:
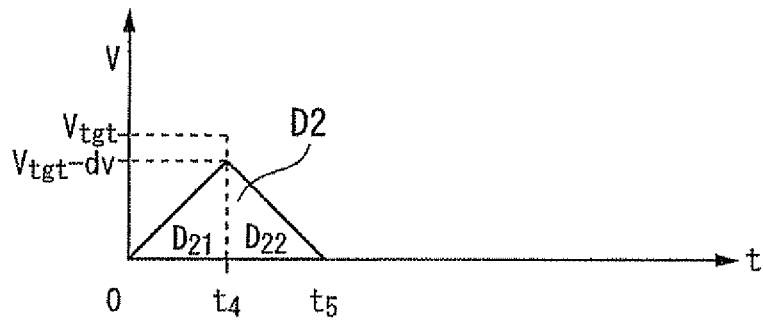

FIGS. 4A and 4B show examples of driving profiles in the present embodiment. In FIGS. 4A and 4B, the lateral axes indicate time t, and vertical axes indicate driving velocity V of the ultrasonic motor 20. The areas indicated by symbols D1 and D2 correspond to drive quantities which are driven by the ultrasonic motor 20 during operations.

FIG. 4A illustrates a first driving profile of the ultrasonic motor 20. FIG. 4B illustrates a second driving profile of the ultrasonic motor 20. FIGS. 4A and 4B illustrate time-variations of the driving velocities of the ultrasonic motor 20.

With reference to FIG. 4A, the first driving profile involves a first acceleration drive period (from t=0 to $t_1$), a constant velocity drive period (from $t_1$ to $t_2$) with a constant velocity at a target driving velocity $V_{tgt}$, and a first deceleration drive period (from $t_2$ to $t_3$). The first acceleration drive period is determined by a period of time in which the ultrasonic motor 20 starts accelerating from velocity zero (V=0) and reaches the target velocity $V_{tgt}$. The target velocity drive period is determined by a period of time in which the ultrasonic motor 20 drives continuously at the target driving velocity $V_{tgt}$. The first deceleration drive time period is determined by a period of time in which the ultrasonic motor 20 starts decelerating from the target driving velocity $V_{tgt}$ and stops driving (V=0). The total area D1 in FIG. 4A shows a total driven quantity that indicates the quantity which has been driven with the ultrasonic motor 20 during the time between t=0 and $t_3$. The total area D1 in FIG. 4A includes first, second and third areas D11, D12, and D13. The first area D11 shows a first driven quantity that indicates the quantity which has been driven with the ultrasonic motor 20 during the time between t=0 and $t_1$ corresponding to the first acceleration drive period. The second area D12 shows a second driven quantity that indicates the quantity which has been driven with the ultrasonic motor 20 during the time between t=$t_1$ and $t_2$ corresponding to the constant velocity drive period. The third area D13 shows a third driven quantity that indicates the quantity which has been driven with the ultrasonic motor 20 during the time between t=$t_2$ and $t_3$ corresponding to the first deceleration drive period.

In FIG. 4A, when the absolute values of acceleration and deceleration are a constant, the time periods of the acceleration and the deceleration become a constant. In the figure, the time period between t=0 and $t_1$ and the time period between $t_2$ and $t_3$ become a constant, that is, the first deceleration drive period and the first deceleration drive time period are the same. The area D1 is expressed by the sum of the areas D11, D12 and D13. As the absolute values of acceleration and deceleration are the constant and the first acceleration drive period and the first deceleration drive time period are the same, the area D11 corresponds to the area D13. Therefore, the area D1 can be expressed by the areas D11 and D12 (e.g., D1=D11+D11+D12). The sum of the areas D11 and D12 is defined as a deceleration starting quantity. Once the driven quantity of the ultrasonic motor 20 reaches the deceleration starting quantity, the ultrasonic motor 20 starts decelerating. Different total driven quantities are provided with respective deceleration starting quantities so that one of the different total driven quantities with its deceleration starting quantity can correspond to the desirable drive quantity which is indicated by the drive command signal Sc. The driving profile table 173 preliminary stores the different total driven quantities and deceleration starting quantities with corresponding one another. For example, when a desirable drive quantity is provided, the driving profile setting unit 174 refers the driving profile table 173 to find the deceleration starting quantity associated with the total driven quantity which corresponds to the desirable drive quantity, and reads out the deceleration starting quantity from the driving profile table 173.

With reference to FIG. 4B, the second driving profile involves a second acceleration drive period (from t=0 to $t_4$) and a second deceleration drive period (from $t_4$ to $t_5$). The second acceleration drive period is determined by a period of time in which the ultrasonic motor 20 starts accelerating from velocity zero (V=0) and reaches a lower velocity $V_{tgt}$-dV. The lower velocity $V_{tgt}$-dV is lower than the target driving velocity $V_{tgt}$. The second deceleration drive time period is determined by a period of time in which the ultrasonic motor 20 starts decelerating from the lower velocity $V_{tgt}$-dV and stops driving (V=0). The total area D2 in FIG. 4B shows the total driven quantity that indicates the quantity which has been driven with the ultrasonic motor 20 during the time between t=0 and $t_5$. The total area D2 in FIG. 4B includes the fourth and fifth areas, D21 and D22. The fourth area D21 shows a fourth driven quantity that indicates the quantity which has been driven with the ultrasonic motor 20 during the time between t=0 and $t_4$. The fifth area D22 shows a second driven quantity that indicates the quantity which has been driven with the ultrasonic motor 20 during the time between t=$t_4$ and t=$t_5$.

When a quantity being driven is predicted to exceed the desirable drive quantity if the ultrasonic motor 20 keeps accelerating up to a predetermined target velocity $V_{tgt}$, the driving profile of the ultrasonic motor 20 is chosen as shown in FIG. 4B. Time indicates a deceleration timing at which the driving of the ultrasonic motor 20 turns to deceleration from acceleration. The driven quantity to be driven by the ultrasonic motor 20 during time $t_4$ is corresponded to the desirable drive quantity indicated by the drive command signal Sc.

As the driving profile table 173 stores driving profiles to correspond to desirable drive quantities to be driven by the ultrasonic motor 20, once a desirable drive quantity is provided, a deceleration starting quantity corresponding to the desirable drive quantity can be provided.

When the driving profile setting unit 174 receives the drive command signal $S_C$ from the upper stream control unit (not illustrated in the figure), the driving profile setting unit 174 transmits the frequency indicating unit 177 a start signal for starting drive of the ultrasonic motor 20 and reads out the deceleration starting quantity whose total driven quantity corresponds to the desirable drive quantity indicated by the drive command signal Sc from the driving profile table 173. The driving profile setting unit 174 receives the position signal indicating a driven quantity from the position detecting unit 15, and when the driven quantity reaches the deceleration starting quantity, the driving profile setting unit 174 transmits a deceleration signal to the frequency indication unit 177.

The temperature-frequency table 175 includes temperature dependent data of a plurality of drive start frequency $f_0$ and a target velocity frequency $f_{tgt}$ as a frequency characteristic of the oscillating actuator, in which the drive start frequency $f_0$ and the target velocity frequency $f_{tgt}$ are dependent on ambient temperatures near the ultrasonic motor 20, and two of the frequencies $f_0$ and $f_{tgt}$ are arranged to correspond one another for different ambient temperatures near the ultrasonic motor 20.

When the frequency selection unit 176 receives the temperature signal from the temperature detecting unit 16, the frequency selection unit 176 reads out the frequency characteristic of the oscillating actuator which indicates the drive start frequency $f_0$ and the target velocity frequency $f_{tgt}$ corresponding to the ambient temperature indicated by the temperature signal from the temperature-frequency table 175. The frequency selection unit 176 transmits signals of the frequencies $f_0$ and $f_{tgt}$ to the frequency indicating unit 177 according to the ambient temperature to adjust the present frequency of the oscillating signal to another frequency based on the frequency characteristic of the oscillating actuator.

The following describes a relationship between drive frequencies of driving signals and driving velocities of the ultrasonic motor 20, which are stored in the temperature-frequency table 175 as frequency characteristics.

Figure 5:
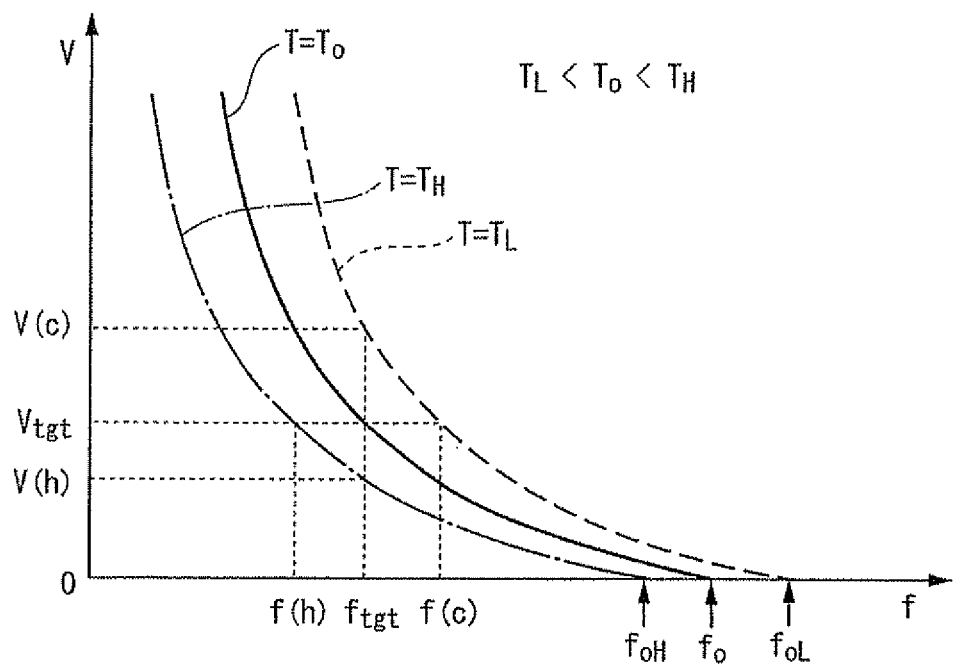
FIG. 5 is a schematic diagram showing an example of relationships between a frequency and driving velocity of an ultrasonic motor for different temperatures in accordance with the embodiment of the present invention.

FIG. 5 is a schematic diagram showing an example of relationships between driving frequencies and driving velocities of an ultrasonic motor 20 for different temperatures, for example, ambient temperatures near the ultrasonic motor 20, $T_0$, $T_L$, and $T_H$ ($T_L<T_0<T_H$). In FIG. 5, the lateral axis indicates the driving frequency f of the ultrasonic motor 20, and the vertical line indicates the driving velocity V of the ultrasonic motor 20. The driving velocity increases with decrease in the frequency of the driving signal. In contrast, the driving velocity decreases with increase in the frequency of the driving signal. The driving velocity of the ultrasonic motor 20 fluctuates depending on temperatures even if a constant driving frequency of the driving signal is applied. This is because the capacitances of the piezoelectric elements 21A and 21B of the ultrasonic motor 20 and the inductance of the amplifier unit 13 vary according to the temperatures. As shown in FIG. 5, the designed velocity $V_{tgt}$ is obtained for a designed frequency $f_{tgt}$ at a predetermined temperature $T_0$ which is determined when the ultrasonic motor 20 is designed. When an ambient temperature $T=T_H$ is higher than the predetermined temperature $T_0$, i.e., $T_H>T_0$, the driving velocity of the ultrasonic motor 20, V(h), becomes smaller than the designed velocity $V_{tgt}$. On the other hand, when the ambient temperature $T=T_L$ is lower than the predetermined temperature $T_0$, i.e., $T_L<T_0$, the driving velocity of the ultrasonic motor 20, V(c), becomes greater than the designed velocity $V_{tgt}$.

To drive the ultrasonic motor 20 at the target driving velocity $V_{tgt}$ at $T_H$, a driving signal with a frequency f(h), which is smaller than the target velocity frequency $f_{tgt}$, needs to be applied to the ultrasonic motor 20. Further, to drive the ultrasonic motor 20 at the target driving velocity $V_{tgt}$ at $T_L$, a driving signal with a frequency f(c), which is greater than the target velocity frequency $f_{tgt}$, needs to be applied to the ultrasonic motor 20. Similarly to the case of the target velocity frequency $f_{tgt}$, the drive start frequency $f_0$ needs to be chosen according to the ambient temperature near the ultrasonic motor 20. At the ambient temperature $T_L$, the driving start frequency, $f_{0L}$, which is greater than the drive start frequency $f_0$, needs to be applied to the ultrasonic motor 20. Further, at the ambient temperature $T_H$, the driving start frequency, $f_{0H}$, which is smaller than the drive start frequency $f_0$, needs to be applied to the ultrasonic motor 20.

The frequency selection unit 176 adjusts the drive start frequency $f_0$ and the target velocity frequency $f_{tgt}$ of the driving signal by using the temperature-frequency table 175, according to the ambient temperature near the ultrasonic motor 20 which is detected with the temperature detecting unit 16.

In FIG. 1, the frequency indicating unit 177 receives the start signal and the deceleration signal from the driving profile setting unit 174 for starting and decelerating the ultrasonic motor 20. The frequency indicating unit 177 receives signals of the drive start frequency $f_0$ and the target velocity frequency $f_{tgt}$ from the frequency selection unit 176.

When receiving the start signal from the driving profile setting unit 174, the frequency indicating unit 177 monotonically decreases the frequency of the oscillating signal of the oscillating unit 11 from the drive start frequency $f_0$ to the target velocity frequency $f_{tgt}$. Further, when receiving the deceleration signal from the driving profile setting unit 174, the frequency indicating unit 177 monotonically increases the frequency of the oscillating signal of the oscillating unit 11.

Figure 6A:
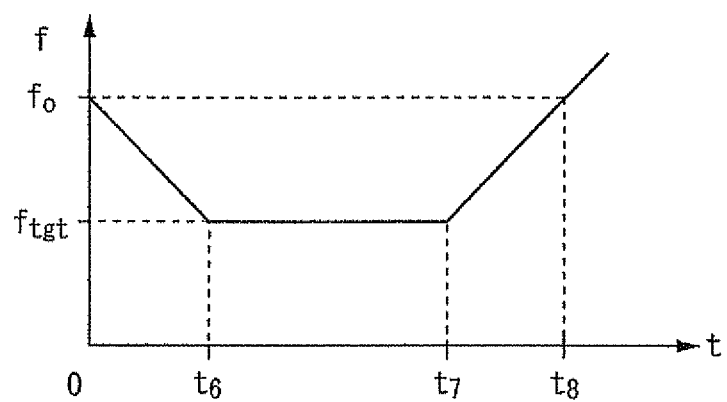
FIGS. 6A and 6B are schematic diagrams showing examples of changes in frequencies of oscillation signals as a function of time transmitted by an oscillator unit in accordance with the embodiment of the present invention.
Figure 6B:
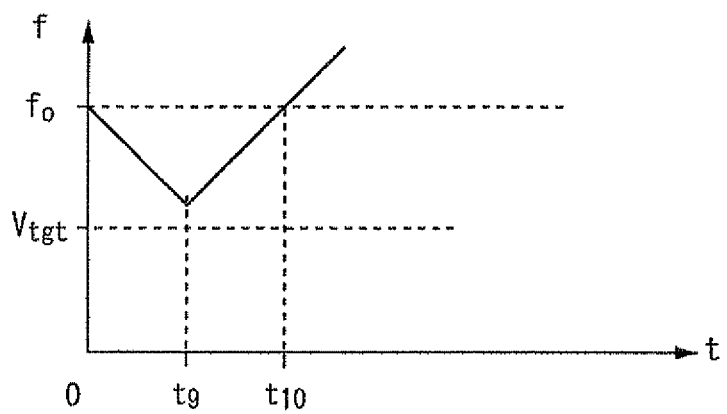

As described above, the frequency indicting unit 177 controls the oscillating unit 11. The oscillating unit 11 transmits signals, as illustrated in FIGS. 6A and 6B, to the phase control unit 12 and the amplifier unit 13. FIGS. 6A and 6B are schematic diagrams showing examples of changes in frequencies of the oscillating signals transmitted by the oscillator unit 11 as a function of time, in accordance with the present embodiment. In FIGS. 6A and 6B, the lateral axes indicate time t, and the vertical axes indicate frequencies f of the driving signals. The ultrasonic motor 20 starts driving when applied the driving signal with a frequency which is smaller than the drive start frequency $f_0$. With decreasing the frequency of the driving signal, the ultrasonic motor 20 drives at greater velocities.

FIGS. 6A and 6B illustrate changes in the frequencies of the driving signals, where the diagrams of the frequencies correspond to changes of the driving velocities shown in FIGS. 4A and 4B, respectively. As shown in FIG. 6A, the frequency indicting unit 177 receives a signal with the drive start frequency $f_0$ from the frequency selection unit 176 for starting drive of the ultrasonic motor 20 at time and transmits the oscillator unit 11 the control signal S1 for monotonically decreasing the frequency of the oscillating signal from the drive start frequency $f_0$ to the target velocity frequency $f_{tgt}$. Once the frequency of the oscillating signal reaches to the target velocity frequency $f_{tgt}$ at $t=t_6$, the frequency indicating unit 177 continues to transmit the control signal S1 with the target velocity frequency $f_{tgt}$ to the oscillator unit 11. When the frequency indicting unit 177 receives a signal for starting deceleration at $t=t_6$ from the driving profile unit 174, the frequency indicting unit 177 monotonically increases the frequency of the oscillating signal of the oscillator unit 11 to exceed the drive start frequency $f_0$ so that the ultrasonic motor 20 stops driving. In FIG. 6A, the drive frequency reaches the drive start frequency $f_0$ at $t=t8$. One the drive frequency exceeds the drive start frequency $f_0$, the ultrasonic motor 20 stops driving.

Further, as shown in FIG. 6B, when the frequency indicating unit 177 receives a signal with the drive start frequency $f_0$ for starting drive at $t=0$ from the frequency selection unit 176, the frequency indicating unit 177 transmits the oscillator unit 11 a command signal S1 for monotonically decreasing the frequency of the oscillating signal from the drive start frequency $f_0$ to the target velocity frequency $f_{tgt}$. On the other hand, when the frequency indicating unit 177 receives another signal at $t=t_9$ for starting deceleration, the frequency indicating unit 177 transmits another control signal S1 to the oscillator unit 11 for monotonically increasing the frequency of the oscillating signal from the oscillator unit 11 and exceeding the drive start frequency $f_0$ so that the ultrasonic motor 20 stops driving. In FIG. 6B, the drive frequency reaches the drive start frequency $f_0$ at $t=t_{10}$. One the drive frequency exceeds the drive start frequency $f_0$, the ultrasonic motor 20 stops driving.

Figure 7:
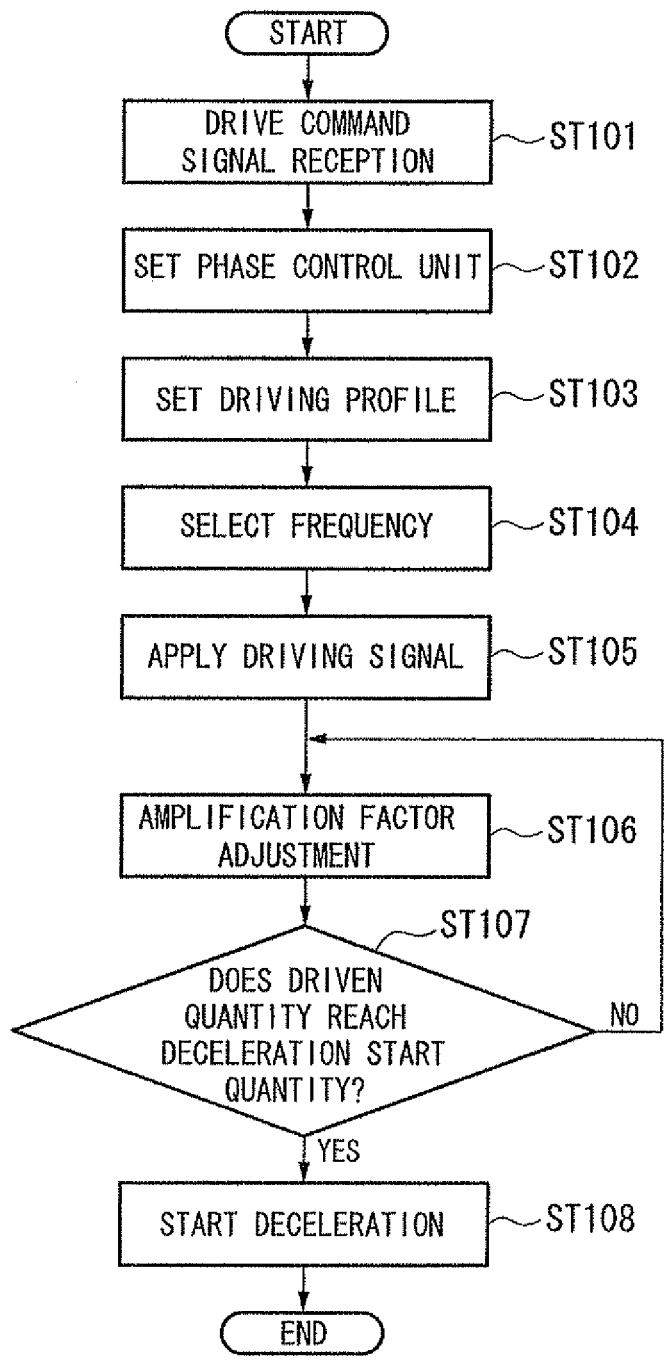
FIG. 7 is a flowchart showing an operation of the oscillating actuator drive unit 10 in accordance with the embodiment of the present invention.

FIG. 7 is a flowchart showing an operation of the oscillating actuator drive unit 10 in accordance with the present embodiment. When the oscillating actuator drive unit 10 receives the drive command signal $S_C$ from the upper stream control unit at ST101, the drive direction indicating unit 171 transmits the forward drive direction signal S3 or the reverse drive direction signal S33 to the phase control unit 12 for setting the first phase of the oscillating signal S2 to a second phase in response to the drive direction indicated by the drive command signal $S_C$ at ST102.

The drive command signal $S_C$ includes a desirable drive quantity to be driven with the oscillating actuator drive unit 10. The driving profile setting unit 174 reads out the deceleration starting quantity from the driving profile table 173, in which its corresponding total driven quantity corresponds to the desirable drive quantity indicated by the drive command signal Sc. Further the driving profile setting unit 174 transmits the start signal to the frequency indication unit 177 at ST103.

The frequency selection unit 176 receives the temperature signal from the temperature detecting unit 16 and reads out the drive start frequency $f_0$ and the target velocity frequency $f_{tgt}$ that correspond to a temperature indicated by the temperature signal at ST104.

When the frequency indication unit 177 receives the start signal from the driving profile unit 174, and receives the drive start frequency $f_0$ and the target velocity frequency $f_{tgt}$ from the frequency selection unit 176, the frequency indication unit 177 transmits the command signal S1 to the oscillator unit 11 for monotonically decreasing the frequency of the oscillating signal of the oscillator unit 11 from the drive start frequency $f_0$ to the target velocity frequency $f_{tgt}$. The oscillating signal of the oscillator unit 11 is converted into a driving signal through the phase control unit 12 and the amplifier unit 13, and then the driving signal is applied to the ultrasonic motor 20 at ST105.

The voltage detecting unit 14 detects voltage of the driving signal applied to the piezoelectric element 21A of the ultrasonic motor 20, and transmits the detected voltage S6 to the amplification factor calculating unit 172. The amplification factor calculating unit 172 computes, in response to the detected voltage S6 received from the voltage detecting unit 14, the amplification factor which can set the voltage being applied to the piezoelectric element 21A of the ultrasonic motor 20 to the target voltage based on the detected voltage S6, and transmits the amplification factor signal S5 indicating the computed amplification factor to the amplifier unit 13 at ST106 for the adjustment of the amplification factor.

The driving profile unit 174 determines if the driven quantity of the ultrasonic motor 20 indicated by the position detecting unit 15 reaches the deceleration start quantity read from the driving profile table 173 in a comparison step of those quantities at ST 107.

If the driven quantity has not reached the deceleration start quantity, being indicated 'NO' at ST107 in FIG. 7, then the signal control unit 17 attempts to repeat the steps ST106 and ST107. The steps ST106 and ST107 will be repeated until the driven quantity reaches the deceleration start quantity.

When the driven quantity reaches the deceleration start quantity, being indicated 'YES' at ST107 in FIG. 7, the driving profile unit 174 transmits the deceleration signal to the frequency indicating unit 177 for starting deceleration of the ultrasonic motor 20 at ST108. The frequency indicating unit 177 transmits the command signal SI to the oscillator unit 11 to increase the frequency of the oscillation signal monotonically until exceeding the drive start frequency $f_0$, so that the ultrasonic motor 20 stops driving.

As described above, the oscillating actuator drive unit 10 drives the ultrasonic motor 20 by applying the driving signal with the target voltage when receiving the drive command signal $S_C$.

Figure 8A:
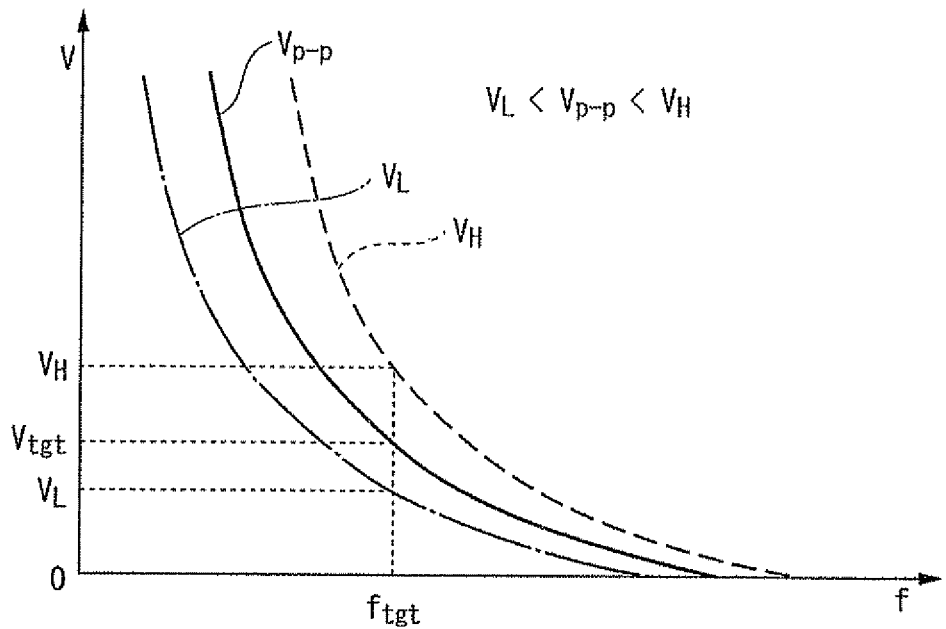
FIG. 8A is a schematic diagram showing an example of a relationship between driving velocities and frequencies of the ultrasonic motor for different peak voltages $V_{p-p}$ in accordance with the embodiment of the present invention.
Figure 8B:
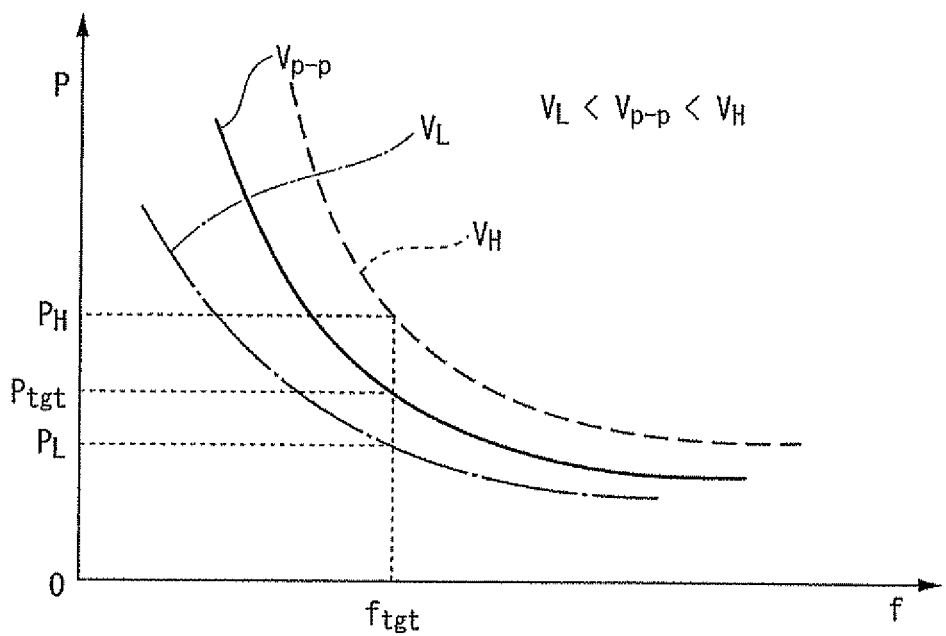
FIG. 8B is a schematic diagram showing an example of a relationship between power consumption and frequencies of the ultrasonic motor for different peak voltages $V_{p-p}$ in accordance with the embodiment of the present invention.

FIG. 8A is a schematic diagram showing an example of a relationship between driving velocities V and driving frequencies f having different peak voltages $V_{p-p}$, applied to the ultrasonic motor 20 in the present embodiment. FIG. 8B is a schematic diagram showing an example of a relationship between power consumption P and driving frequencies f for different peak voltages $V_{p-p}$ applied to the ultrasonic motor 20 in the present embodiment. In FIG. 8A, the lateral axis indicates frequencies of driving signals applied to the ultrasonic motor 20, and the vertical axis indicates driving velocities of the ultrasonic motor 20. As shown in FIG. 8A, a solid line indicates a driving velocity-frequency curve for a predetermined peak voltage $V_{p-p}$. A broken line indicates a driving velocity-frequency curve for a peak voltage $V_H$ that is greater than the predetermined peak voltage, and a dash-dot line indicates another driving velocity-frequency curve for a peak voltage $V_L$ that is smaller than the predetermined peak voltage. For the target velocity frequency $f_{tgt}$ of the solid line, the broken line shows a driving velocity $V_H$ that is greater than the target driving velocity $V_{tgt}$, and the dash-dot line shows a driving velocity $V_L$ that is smaller than the target driving velocity $V_{tgt}$. Therefore, when the peak voltage of the driving signal is greater than the predetermined peak voltage $V_{p-p}$, the obtained driving velocity $V_H$ becomes greater than the target driving velocity $V_{tgt}$. When the peak voltage is smaller than the predetermined peak voltage $V_{p-p}$, the obtained driving velocity $V_L$ becomes smaller than the target driving velocity $V_{tgt}$.

Further, in FIG. 8B, the lateral axis indicates frequencies of driving signals applied to the ultrasonic motor 20, and the vertical axis indicates power consumption of the ultrasonic motor 20. As shown in FIG. 8B, a solid line illustrates a power consumption-frequency curve where the driving signal includes a predetermined peak voltage $V_{p-p}$ and the target power consumption is given at a target velocity frequency $f_{tgt}$. A broken line illustrates a power consumption-frequency curve for a peak voltage $V_H$ that is greater than the predetermined peak voltage $V_{p-p}$, and a dash-dot line illustrates another power consumption-frequency curve for a peak voltage $V_L$ that is smaller than the predetermined peak voltage V.

For a given target velocity frequency $f_{tgt}$, when the peak voltage of the driving signal is greater than the predetermined peak voltage $V_{p-p}$, the power consumption $P_H$ becomes greater than the target power consumption $P_{tgt}$. When the peak voltage is smaller than the predetermined peak voltage $V_{P-p}$, the power consumption $P_L$ becomes smaller than the target power consumption $P_{tgt}$.

As described above, when the peak voltage of the driving signal fluctuates, the ultrasonic motor 20 does not drive accurately because of the fluctuation of driving velocity, and in some cases, the ultrasonic motor 20 increases its power consumption. For the oscillating actuator drive unit 10 in the present embodiment, the voltage detecting unit 14 detects the voltage of the driving signal applied to the ultrasonic motor 20, and the amplification factor calculating unit 172 computes the amplification factor based on the detected voltage. Further the amplification factor calculating unit 172 transmits the factor signal S5 indicating the amplification factor to the amplifier unit 13 for setting the voltage of the driving signal applied to the ultrasonic motor 20 to the target voltage, so that the amplifier unit 13 maintains the transmitting voltage of the driving signal at the target voltage. Thereby, the oscillating actuator drive unit 10 can minimize the fluctuations of the driving velocity V and the power consumption P, and can prevent from increase in the power consumption P even if the manufacturing process causes variation on capacitances of the piezoelectric elements 21A and 21B of the ultrasonic motor 20 and variation on inductance of the amplifier unit 13. Further, inaccurate driving of the ultrasonic motor 20 can be minimized by reducing the fluctuation of driving velocity V.

For the oscillating actuator drive unit 10, the frequency selection unit 176 adjusts the drive start frequency $f_0$ and the target driving frequency $f_{tgt}$ by using the temperature-frequency table 175. Thereby the oscillating actuator drive unit 10 can minimize an increase in its power consumption due to the variation of capacitances of the piezoelectric elements 21A and 21B of the ultrasonic motor 20 and due to the variation of the inductance of the amplifier unit 13 caused by fluctuation of temperature. Further, the oscillating actuator drive unit 10 can reduce degradation of driving accuracy which is caused when the driving velocity of the ultrasonic motor 20 fluctuates due to change in temperature.

Further, a second voltage detecting unit may be provided for the oscillating actuator drive unit 10 so that the second voltage detecting unit detects the voltage applied to the piezoelectric element 21B, and then the oscillating actuator drive unit 10 controls respective voltages of the signals transmitted by the phase-A amplifier unit 131A and the phase-B amplifier unit 131B.

Figure 9:
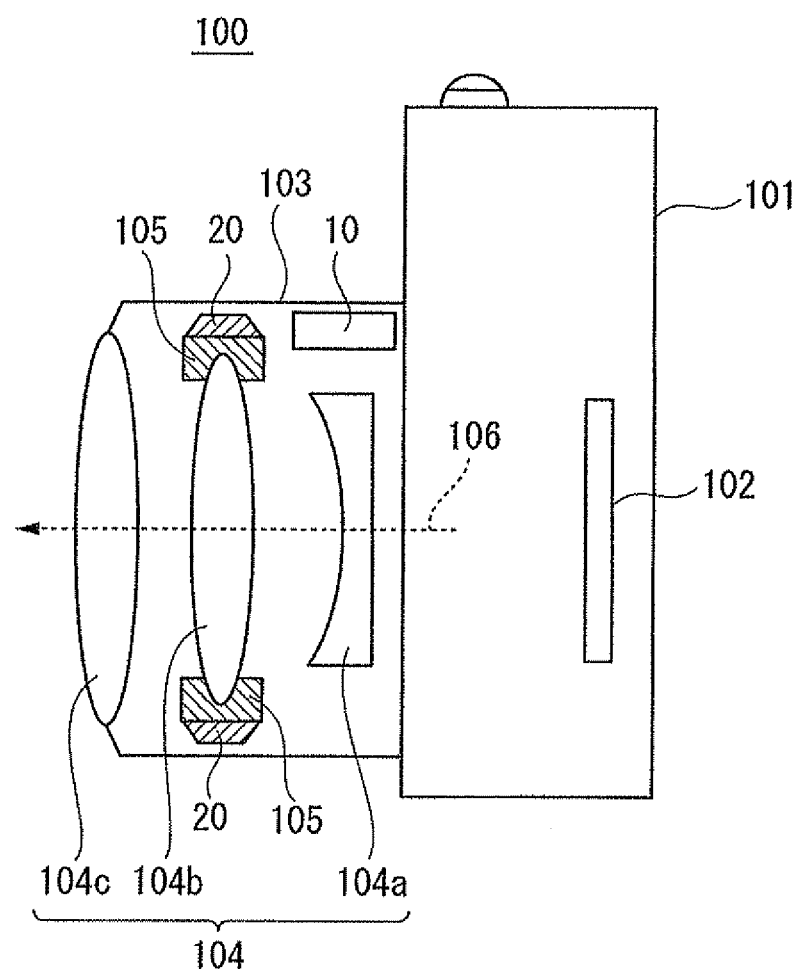
FIG. 9 is a schematic diagram of an example showing a configuration of an optical apparatus, a camera equipped with the oscillating actuator drive unit in accordance with the embodiment of the present invention.

FIG. 9 is a schematic diagram of an example showing a configuration of an optical apparatus, which is a camera 100 equipped with the oscillating actuator drive unit 10 according to the present embodiment. The camera 100 includes a camera body 101 having an imaging element 102, and a lens barrel 103 having a lens unit 104 composed of lenses 104a, 104b, and 104c. Further, the lens barrel 103 includes a cam barrel 105 which supports the lens 104b, an ultrasonic motor 20 which moves the cam barrel 105, and an oscillating actuator drive unit 10 which drives the ultrasonic motor 20. The lens barrel 103 adjusts focusing by moving the cam barrel 105 toward an optical axis direction 106, in which the ultrasonic motor 20 is driven with the oscillating actuator drive unit 10 and moves the cam barrel 105.

Further, for the camera 100, the lens barrel 103 may be detachable with the camera body 101 or may be fixed with the camera body 101 as a single unit. Although it is described as example that the lens barrel 103 is equipped with the oscillating actuator drive unit 10, the oscillating actuator drive unit 10 may be equipped with the camera body 101.

The oscillating actuator drive unit 10 described above may include a computer system. In such case, the data processing procedure of the signal control unit 17 is recorded as a computer program in a computer-readable recording media, so that a computer can read the computer program and perform the data processing procedure of the signal control unit 17. The computer-readable recording media may be a magnetic disk, a magneto-optical disk, a CD-ROM, a DVD-ROM, a semiconductor memory or the like. Moreover, the computer program may be distributed to a computer via a telecommunication line or a communication network or the like so that the computer can read the computer program and perform the program.

While some embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In one embodiment, an oscillating actuator drive unit includes an oscillator unit that generates an oscillating signal having a first frequency; an amplifier unit that amplifies the oscillating signal based on a first amplification factor and generates a first amplified oscillating signal as a driving signal for driving an oscillating actuator; a voltage detecting unit that detects a first voltage associated with the first amplified oscillating signal; and a signal control unit that receives the first voltage from the voltage detecting unit and computes a second amplification factor with reference to at least the first voltage, the signal control unit supplying the second amplification factor to the amplifier unit to allow the amplifier unit to amplify the oscillating signal based on the second amplification factor, the amplified oscillating signal having a second voltage, the second voltage being closer to a target voltage than the first voltage.

In the embodiment, the oscillating actuator drive unit can further includes a position detecting unit that detects a first drive quantity being driven by the oscillating actuator, wherein the signal control unit makes the oscillator unit turn the first frequency of the oscillating signal into a second frequency, in response to the first drive quantity and a second drive quantity indicated by an input command.

In the embodiment, the oscillating actuator drive unit can further includes a temperature detecting unit that detects an ambient temperature of the oscillating actuator; and a temperature-frequency table that stores a plurality of frequency characteristics of the oscillating actuator corresponding to different ambient temperatures of the oscillating actuator, wherein the signal control unit reads out a frequency characteristic of the oscillating actuator from the temperature-frequency table in response to the detected ambient temperature, and adjusts the first frequency of the oscillating signal to a third frequency based on the frequency characteristic of the oscillating actuator.

In the embodiment, the oscillating actuator drive unit can further includes a phase control unit provided between the oscillator unit and the amplifier unit, wherein the phase control unit switches first and second phases of the oscillating signal of the oscillator unit in response to a drive direction signal indicated by an input command.

In one embodiment, a lens barrel includes a lens; a motor driving the lens; an oscillating actuator coupled to the motor;

and an oscillating actuator drive unit eclectically coupled to the oscillating actuator, and the oscillating actuator drive unit including an oscillator unit that generates an oscillating signal having a first frequency; an amplifier unit that amplifies the oscillating signal based on a first amplification factor and generates a first amplified oscillating signal as a driving signal for driving the oscillating actuator; a voltage detecting unit that detects a first voltage associated with the first amplified oscillating signal; and a signal control unit that receives the first voltage from the voltage detecting unit and computes a second amplification factor with reference to at least the first voltage, the signal control unit supplying the second amplification factor to the amplifier unit to allow the amplifier unit to amplify the oscillating signal based on the second amplification factor, the amplified oscillating signal having a second voltage, the second voltage being closer to a target voltage than the first voltage.

In the embodiment, the lens barrel, wherein the oscillating actuator drive unit can further includes a position detecting unit that detects a first drive quantity being driven by the oscillating actuator, wherein the signal control unit makes the oscillator unit turn the first frequency of the oscillating signal into a second frequency, in response to the first drive quantity and a second drive quantity indicated by an input command.

In the embodiment, the lens barrel, wherein the oscillating actuator drive unit can further includes a temperature detecting unit that detects an ambient temperature of the oscillating actuator; and a temperature-frequency table that stores a plurality of frequency characteristics of the oscillating actuator corresponding to different ambient temperatures of the oscillating actuator, wherein the signal control unit reads out a frequency characteristic of the oscillating actuator from the temperature-frequency table in response to the detected ambient temperature, and adjusts the first frequency of the oscillating signal to a third frequency based on the frequency characteristic of the oscillating actuator.

In the embodiment, the lens barrel, wherein the oscillating actuator drive unit can further includes a phase control unit provided between the oscillator unit and the amplifier unit, wherein the phase control unit switches first and second phases of the oscillating signal of the oscillator unit in response to a drive direction signal indicated by an input command.

In one embodiment, an optical apparatus includes an optical system; and an oscillating actuator drive unit coupled to the optical system, and the oscillating actuator drive unit comprising an oscillator unit that generates an oscillating signal having a first frequency; an amplifier unit that amplifies the oscillating signal based on a first amplification factor and generates a first amplified oscillating signal as a driving signal for driving an oscillating actuator; a voltage detecting unit that detects a first voltage associated with the first amplified oscillating signal; and a signal control unit that receives the first voltage from the voltage detecting unit and computes a second amplification factor with reference to at least the first voltage, the signal control unit supplying the second amplification factor to the amplifier unit to allow the amplifier unit to amplify the oscillating signal based on the second amplification factor, the amplified oscillating signal having a second voltage, the second voltage being closer to a target voltage than the first voltage.

In the embodiment, the optical apparatus, wherein the oscillating actuator drive unit can further includes a position detecting unit that detects a first drive quantity being driven by the oscillating actuator, wherein the signal control unit makes the oscillator unit turn the first frequency of the oscillating signal into a second frequency, in response to the first drive quantity and a second drive quantity indicated by an input command.

In the embodiment, the optical apparatus, wherein the oscillating actuator drive unit can further includes a temperature detecting unit that detects an ambient temperature of the oscillating actuator; and a temperature-frequency table that stores a plurality of frequency characteristics of the oscillating actuator corresponding to different ambient temperatures of the oscillating actuator, wherein the signal control unit reads out a frequency characteristic of the oscillating actuator from the temperature-frequency table in response to the detected ambient temperature, and adjusts the first frequency of the oscillating signal to a third frequency based on the frequency characteristic of the oscillating actuator.

In the embodiment, the optical apparatus, wherein the oscillating actuator drive unit can further includes a phase control unit provided between the oscillator unit and the amplifier unit, wherein the phase control unit switches first and second phases of the oscillating signal of the oscillator unit in response to a drive direction signal indicated by an input command.

In one embodiment, a method for adjusting a voltage of an oscillating signal, the method includes generating an oscillating signal having a first frequency; amplifying the oscillating signal based on a first amplification factor to generate a first amplified oscillating signal as a driving signal for driving an oscillating actuator; detecting a first voltage associated with the first amplified oscillating signal; computing a second amplification factor with reference to at least the first voltage; and amplify the oscillating signal based on the second amplification factor, the amplified oscillating signal having a second voltage, the second voltage being closer to a target voltage than the first voltage.

In the embodiment, the method for adjusting a voltage of an oscillating signal can further includes detecting a first drive quantity being driven by the oscillating actuator; and turning the first frequency of the oscillating signal into a second frequency in response to the first drive quantity and a second drive quantity indicated by a command.

In the embodiment, the method for adjusting a voltage of an oscillating signal can further includes detecting an ambient temperature of the oscillating actuator; storing a plurality of frequency characteristics of the oscillating actuator corresponding to different ambient temperatures; reading out a frequency characteristic of the oscillating actuator from a temperature-frequency table in response to the ambient temperature; and adjusting the first frequency of the oscillating signal to a third frequency based on the frequency characteristic.

In the embodiment, the method for adjusting a voltage of an oscillating signal can further includes switching first and second phases of the oscillating signal before amplifying the oscillating signal.

In one embodiment, a computer-readable recording medium recording a program which causes an ultrasonic motor to drive, the program includes generating an oscillating signal having a first frequency; amplifying the oscillating signal based on a first amplification factor to generate a first amplified oscillating signal as a driving signal for driving an oscillating actuator; detecting a first voltage associated with the first amplified oscillating signal; computing a second amplification factor with reference to at least the first voltage; and amplify the oscillating signal based on the second amplification factor, the amplified oscillating signal having a second voltage, the second voltage being closer to a target voltage than the first voltage.

In the embodiment, the computer-readable recording medium can further includes detecting a first drive quantity being driven by the oscillating actuator; and turning the first frequency of the oscillating signal into a second frequency in response to the first drive quantity and a second drive quantity indicated by a command.

In the embodiment, the computer-readable recording medium can further includes detecting an ambient temperature of the oscillating actuator; storing a plurality of frequency characteristics of the oscillating actuator corresponding to different ambient temperatures; reading out a frequency characteristic of the oscillating actuator from a temperature-frequency table in response to the ambient temperature; and adjusting the first frequency of the oscillating signal to a third frequency based on the frequency characteristic.

In the embodiment, the computer-readable recording medium can further includes switching first and second phases of the oscillating signal before amplifying the oscillating signal.

What is claimed is:

1. An oscillating actuator drive unit comprising:
    an oscillator unit that generates an oscillating signal having a first frequency;
    an amplifier unit that amplifies the oscillating signal based on a first amplification factor and generates a first amplified oscillating signal as a driving signal for driving an oscillating actuator;
    a voltage detecting unit that detects a first voltage associated with the first amplified oscillating signal;
    a signal control unit that receives the first voltage from the voltage detecting unit and computes a second amplification factor with reference to at least the first voltage, the signal control unit supplying the second amplification factor to the amplifier unit to allow the amplifier unit to amplify the oscillating signal based on the second amplification factor, the amplified oscillating signal having a second voltage, the second voltage being closer to a target voltage than the first voltage; and
    a temperature detecting unit that detects an ambient temperature of the oscillating actuator,
    wherein the signal control unit adjusts the frequency of the oscillating signal that is generated by the oscillator unit so as to be decreased when the ambient temperature is greater than a predetermined temperature, and adjusts the frequency of the oscillating signal that is generated by the oscillator unit so as to be increased when the ambient temperature is smaller than the predetermined temperature.

2. The oscillating actuator drive unit according to claim 1, further comprising:
    a position detecting unit that detects a first drive quantity being driven by the oscillating actuator,
    wherein the signal control unit makes the oscillator unit turn the first frequency of the oscillating signal into a second frequency, in response to the first drive quantity and a second drive quantity indicated by an input command.

3. The oscillating actuator drive unit according to claim 1, further comprising:
    a temperature-frequency table that stores a plurality of frequency characteristics of the oscillating actuator corresponding to different ambient temperatures of the oscillating actuator,
    wherein the signal control unit reads out a frequency characteristic of the oscillating actuator from the temperature-frequency table in response to the detected ambient temperature, and adjusts the first frequency of the oscillating signal to a third frequency based on the frequency characteristic of the oscillating actuator.

4. The oscillating actuator drive unit according to claim 1, further comprising:
    a phase control unit provided between the oscillator unit and the amplifier unit,
    wherein the phase control unit switches first and second phases of the oscillating signal of the oscillator unit in response to a drive direction signal indicated by an input command.

5. A lens barrel comprising:
    a lens;
    a motor driving the lens;
    an oscillating actuator coupled to the motor; and
    an oscillating actuator drive unit electrically coupled to the oscillating actuator, the oscillating actuator drive unit comprising:
        an oscillator unit that generates an oscillating signal having a first frequency;
        an amplifier unit that amplifies the oscillating signal based on a first amplification factor and generates a first amplified oscillating signal as a driving signal for driving the oscillating actuator;
        a voltage detecting unit that detects a first voltage associated with the first amplified oscillating signal;
        a signal control unit that receives the first voltage from the voltage detecting unit and computes a second amplification factor with reference to at least the first voltage, the signal control unit supplying the second amplification factor to the amplifier unit to allow the amplifier unit to amplify the oscillating signal based on the second amplification factor, the amplified oscillating signal having a second voltage, the second voltage being closer to a target voltage than the first voltage; and
        a temperature detecting unit that detects an ambient temperature of the oscillating actuator,
    wherein the signal control unit adjusts the frequency of the oscillating signal that is generated by the oscillator unit so as to be decreased when the ambient temperature is greater than a predetermined temperature, and adjusts the frequency of the oscillating signal that is generated by the oscillator unit so as to be increased when the ambient temperature is smaller than the predetermined temperature.

6. The lens barrel as claimed in claim 5, wherein the oscillating actuator drive unit further comprises:
    a position detecting unit that detects a first drive quantity being driven by the oscillating actuator,
    wherein the signal control unit makes the oscillator unit turn the first frequency of the oscillating signal into a second frequency, in response to the first drive quantity and a second drive quantity indicated by an input command.

7. The lens barrel as claimed in claim 5, wherein the oscillating actuator drive unit further comprises:
    a temperature-frequency table that stores a plurality of frequency characteristics of the oscillating actuator corresponding to different ambient temperatures of the oscillating actuator,
    wherein the signal control unit reads out a frequency characteristic of the oscillating actuator from the temperature-frequency table in response to the detected ambient temperature, and adjusts the first frequency of the oscillating signal to a third frequency based on the frequency characteristic of the oscillating actuator.

8. The lens barrel as claimed in claim 5, wherein the oscillating actuator drive unit further comprises:
a phase control unit provided between the oscillator unit and the amplifier unit,
wherein the phase control unit switches first and second phases of the oscillating signal of the oscillator unit in response to a drive direction signal indicated by an input command.

9. An optical apparatus comprising:
an optical system; and
an oscillating actuator drive unit coupled to the optical system, the oscillating actuator drive unit comprising:
an oscillator unit that generates an oscillating signal having a first frequency;
an amplifier unit that amplifies the oscillating signal based on a first amplification factor and generates a first amplified oscillating signal as a driving signal for driving an oscillating actuator;
a voltage detecting unit that detects a first voltage associated with the first amplified oscillating signal;
a signal control unit that receives the first voltage from the voltage detecting unit and computes a second amplification factor with reference to at least the first voltage, the signal control unit supplying the second amplification factor to the amplifier unit to allow the amplifier unit to amplify the oscillating signal based on the second amplification factor, the amplified oscillating signal having a second voltage, the second voltage being closer to a target voltage than the first voltage; and
a temperature detecting unit that detects an ambient temperature of the oscillating actuator,
wherein the signal control unit adjusts the frequency of the oscillating signal that is generated by the oscillator unit so as to be decreased when the ambient temperature is greater than a predetermined temperature, and adjusts the frequency of the oscillating signal that is generated by the oscillator unit so as to be increased when the ambient temperature is smaller than the predetermined temperature.

10. The optical apparatus as claimed in claim 9, wherein the oscillating actuator drive unit further comprises:
a position detecting unit that detects a first drive quantity being driven by the oscillating actuator,
wherein the signal control unit makes the oscillator unit turn the first frequency of the oscillating signal into a second frequency, in response to the first drive quantity and a second drive quantity indicated by an input command.

11. The optical apparatus as claimed in claim 9, wherein the oscillating actuator drive unit further comprises:
a temperature-frequency table that stores a plurality of frequency characteristics of the oscillating actuator corresponding to different ambient temperatures of the oscillating actuator,
wherein the signal control unit reads out a frequency characteristic of the oscillating actuator from the temperature-frequency table in response to the detected ambient temperature, and adjusts the first frequency of the oscillating signal to a third frequency based on the frequency characteristic of the oscillating actuator.

12. The optical apparatus as claimed in claim 9, wherein the oscillating actuator drive unit further comprises:
a phase control unit provided between the oscillator unit and the amplifier unit,
wherein the phase control unit switches first and second phases of the oscillating signal of the oscillator unit in response to a drive direction signal indicated by an input command.

13. A method for adjusting a voltage of an oscillating signal, the method comprising:
generating an oscillating signal having a first frequency;
amplifying the oscillating signal based on a first amplification factor to generate a first amplified oscillating signal as a driving signal for driving an oscillating actuator;
detecting a first voltage associated with the first amplified oscillating signal;
computing a second amplification factor with reference to at least the first voltage;
amplifying the oscillating signal based on the second amplification factor, the amplified oscillating signal having a second voltage, the second voltage being closer to a target voltage than the first voltage;
detecting an ambient temperature of the oscillating actuator; and
adjusting the frequency of the oscillating signal,
wherein the frequency of the oscillating signal is decreased when the ambient temperature is greater than a predetermined temperature, and the frequency of the oscillating signal is increased when the ambient temperature is smaller than the predetermined temperature.

14. The method for adjusting a voltage of an oscillating signal as claimed in claim 13, further comprising:
detecting a first drive quantity being driven by the oscillating actuator; and
turning the first frequency of the oscillating signal into a second frequency in response to the first drive quantity and a second drive quantity indicated by a command.

15. The method for adjusting a voltage of an oscillating signal as claimed in claim 13, further comprising:
storing a plurality of frequency characteristics of the oscillating actuator corresponding to different ambient temperatures;
reading out a frequency characteristic of the oscillating actuator from a temperature-frequency table in response to the ambient temperature; and
adjusting the first frequency of the oscillating signal to a third frequency based on the frequency characteristic.

16. The method for adjusting a voltage of an oscillating signal as claimed in claim 13, further comprising:
switching first and second phases of the oscillating signal before amplifying the oscillating signal.

17. A non-transitory computer-readable recording medium recording a program which causes an ultrasonic motor to drive, the program causing the execution of a method comprising:
generating an oscillating signal having a first frequency;
amplifying the oscillating signal based on a first amplification factor to generate a first amplified oscillating signal as a driving signal for driving an oscillating actuator;
detecting a first voltage associated with the first amplified oscillating signal;
computing a second amplification factor with reference to at least the first voltage;
amplifying the oscillating signal based on the second amplification factor, the amplified oscillating signal having a second voltage, the second voltage being closer to a target voltage than the first voltage;
detecting an ambient temperature of the oscillating actuator; and adjusting the frequency of the oscillating signal,
wherein the frequency of the oscillating signal is decreased when the ambient temperature is greater than a predetermined temperature, and the frequency of the oscillating signal is increased when the ambient temperature is smaller than the predetermined temperature.

18. The non-transitory computer-readable recording medium as claimed in claim 17, execution of the method further comprising:
detecting a first drive quantity being driven by the oscillating actuator; and
turning the first frequency of the oscillating signal into a second frequency in response to the first drive quantity and a second drive quantity indicated by a command.

19. The non-transitory computer-readable recording medium as claimed in claim 17, execution of the method further comprising:
storing a plurality of frequency characteristics of the oscillating actuator corresponding to different ambient temperatures;
reading out a frequency characteristic of the oscillating actuator from a temperature-frequency table in response to the ambient temperature; and
adjusting the first frequency of the oscillating signal to a third frequency based on the frequency characteristic.

20. The non-transitory computer-readable recording medium as claimed in claim 17, execution of the method further comprising:
switching first and second phases of the oscillating signal before amplifying the oscillating signal.

21. The oscillating actuator drive unit according to claim 1, further comprising:
a storing unit that stores a correspondence relationship between the ambient temperature of the oscillating actuator and the frequency of the oscillating signal,
wherein the signal control unit reads the frequency of the oscillating signal corresponding to the ambient temperature that is detected by the temperature detecting unit, from the storing unit, and performs the adjustment of the frequency.

22. The lens barrel as claimed in claim 5, wherein the oscillating actuator drive unit further comprises:
a storing unit that stores a correspondence relationship between the ambient temperature of the oscillating actuator and the frequency of the oscillating signal,
wherein the signal control unit reads the frequency of the oscillating signal corresponding to the ambient temperature that is detected by the temperature detecting unit, from the storing unit, and performs the adjustment of the frequency.

23. The optical apparatus as claimed in claim 9, wherein the oscillating actuator drive unit further comprises:
a storing unit that stores a correspondence relationship between the ambient temperature of the oscillating actuator and the frequency of the oscillating signal,
wherein the signal control unit reads the frequency of the oscillating signal corresponding to the ambient temperature that is detected by the temperature detecting unit, from the storing unit, and performs the adjustment of the frequency.

24. The method for adjusting a voltage of an oscillating signal as claimed in claim 13, further comprising:
storing a correspondence relationship between the ambient temperature of the oscillating actuator and the frequency of the oscillating signal, in a storing unit, and
reading, from the storing unit, the frequency of the oscillating signal corresponding to the ambient temperature that is detected by the temperature detecting unit from the stored correspondence relationship.

25. The non-transitory computer-readable recording medium as claimed in claim 17, execution of the method further comprising:
storing, in a storing unit, a correspondence relationship between the ambient temperature of the oscillating actuator and the frequency of the oscillating signal, and
reading the frequency of the oscillating signal corresponding to the ambient temperature that is detected by the temperature detecting unit from the stored correspondence relationship.

* * * * *